(12) United States Patent
Zaag et al.

(10) Patent No.: US 11,757,117 B2
(45) Date of Patent: Sep. 12, 2023

(54) FUEL CELL SYSTEMS WITH SERIES-CONNECTED SUBSYSTEMS

(71) Applicant: HYDROGENICS CORPORATION, Mississauga (CA)

(72) Inventors: Nader Zaag, Milton (CA); Paolo Forte, Maple (CA); Dennis Böhm, Recklinghausen (DE); John Yui Ki Poon, Thornhill (CA)

(73) Assignee: HYDROGENICS CORPORATION, Mississauga (CA)

( * ) Notice: Subject to any disclaimer, the term of this patent is extended or adjusted under 35 U.S.C. 154(b) by 0 days.

(21) Appl. No.: 17/823,229

(22) Filed: Aug. 30, 2022

(65) Prior Publication Data

US 2023/0070193 A1  Mar. 9, 2023

Related U.S. Application Data

(60) Provisional application No. 63/240,709, filed on Sep. 3, 2021.

(51) Int. Cl.
| | |
|---|---|
| *H01M 8/04955* | (2016.01) |
| *B60L 50/72* | (2019.01) |
| *B60L 58/30* | (2019.01) |
| *H01M 8/04537* | (2016.01) |
| *H01M 8/24* | (2016.01) |
| *B60L 58/40* | (2019.01) |

(52) U.S. Cl.
CPC ......... *H01M 8/04955* (2013.01); *B60L 50/72* (2019.02); *B60L 58/30* (2019.02); *H01M 8/04559* (2013.01); *H01M 8/24* (2013.01); *B60L 58/40* (2019.02); *H01M 2250/20* (2013.01)

(58) Field of Classification Search
CPC .... H01M 2250/20; B50L 50/72; B50L 58/30; B50L 58/40
See application file for complete search history.

(56) References Cited

U.S. PATENT DOCUMENTS

| | | |
|---|---|---|
| 9,238,465 B1 | 1/2016 | Ghannam et al. |
| 10,203,735 B2 | 2/2019 | Gross et al. |
| 2002/0031692 A1 | 3/2002 | Fuglevand et al. |

(Continued)

FOREIGN PATENT DOCUMENTS

| | | |
|---|---|---|
| DE | 60221630 | 9/2008 |
| DE | 102020101527 | 7/2021 |

(Continued)

*Primary Examiner* — Adam A Arciero
(74) *Attorney, Agent, or Firm* — Barnes & Thornburg LLP

(57) ABSTRACT

A system includes a fuel cell engine, a plurality of switching devices, and a controller. The fuel cell engine includes a plurality of fuel cell modules connected in series as a fuel cell string, and then a plurality of these strings connected in parallel. The switching device(s) are electrically coupled to bypass when required each module(s) and or disconnect each string(s). The decision whether a module(s) and/or string(s) are bypassed, disconnected, or left to operate is based on a sensory feedback that is input into the finite state machine and fault management process that are embedded within the fuel cell controller. The bypassing scheme at the module level is handled in a manner such that the remaining modules within a series string can provide continuous, uninterrupted flow of current to the end application.

15 Claims, 7 Drawing Sheets

(56) References Cited

U.S. PATENT DOCUMENTS

| | | | |
|---|---|---|---|
| 2004/0009380 A1* | 1/2004 | Pearson | H01M 8/04947 |
| | | | 429/513 |
| 2004/0202901 A1 | 10/2004 | Logan et al. | |
| 2004/0247964 A1 | 12/2004 | Sadamoto et al. | |
| 2005/0112428 A1 | 5/2005 | Freeman et al. | |
| 2005/0142406 A1 | 6/2005 | Obata et al. | |
| 2006/0141299 A1 | 6/2006 | Piccirillo | |
| 2008/0160370 A1 | 7/2008 | Masse et al. | |
| 2008/0176120 A1 | 7/2008 | Dong et al. | |
| 2008/0220301 A1 | 9/2008 | LaBreche | |
| 2010/0104894 A1* | 4/2010 | Lee | H01M 8/04753 |
| | | | 429/9 |
| 2010/0136379 A1* | 6/2010 | King | B60L 58/40 |
| | | | 429/432 |

FOREIGN PATENT DOCUMENTS

| | | |
|---|---|---|
| JP | 2010251279 | 11/2010 |
| JP | 2011034782 | 2/2011 |

\* cited by examiner

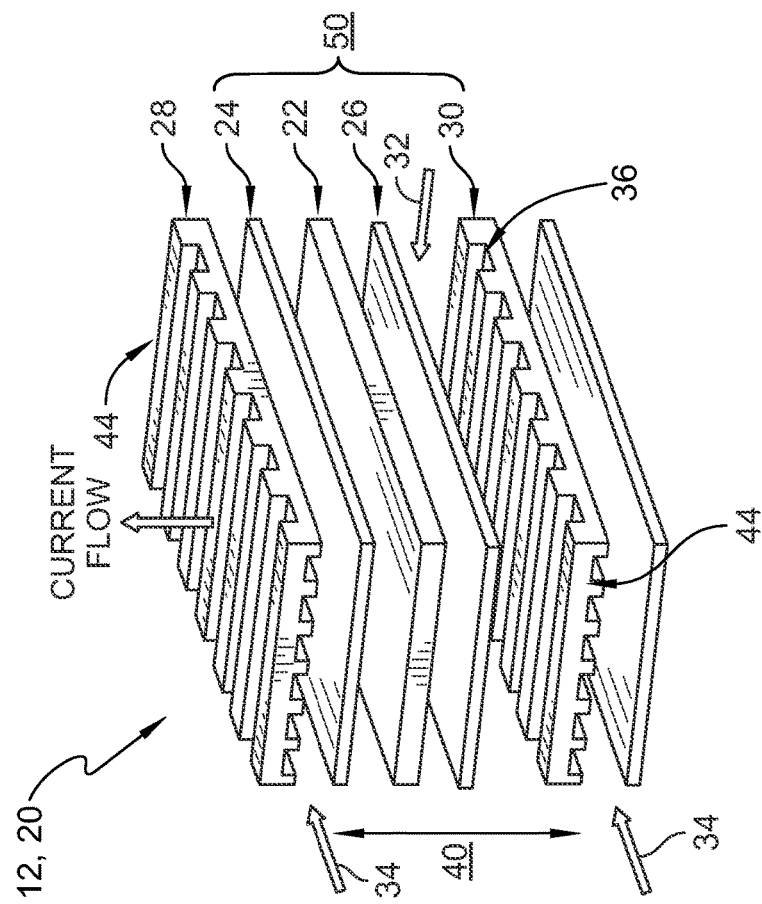
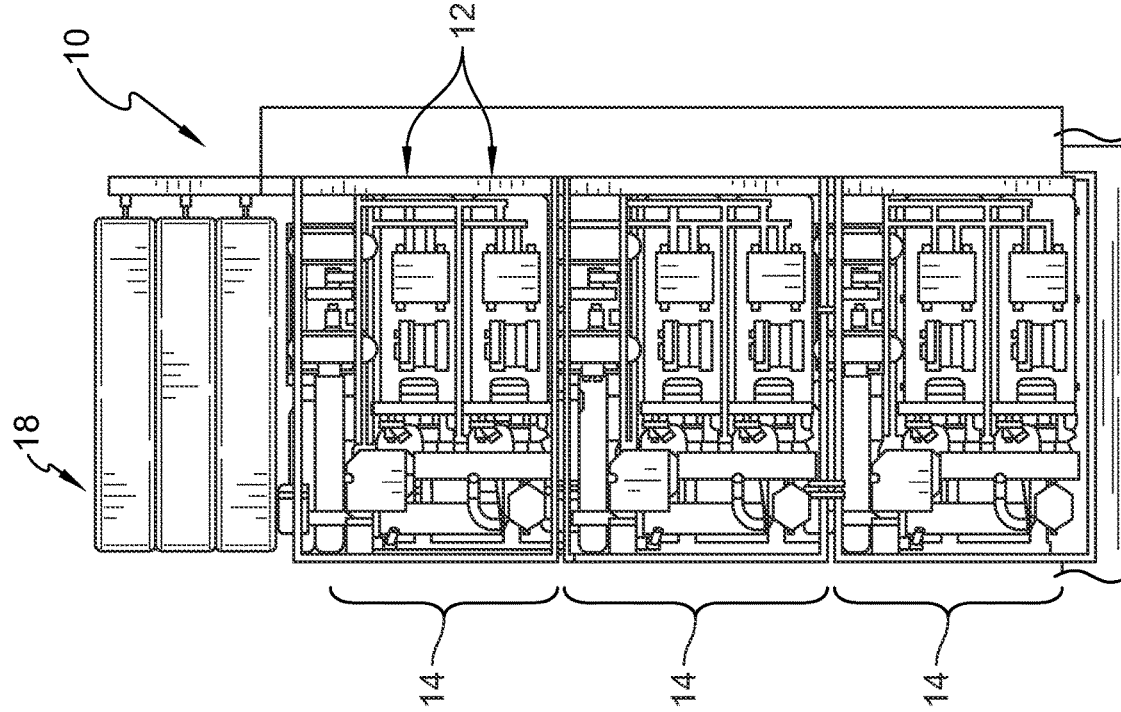
FIG. 1C
FIG. 1B

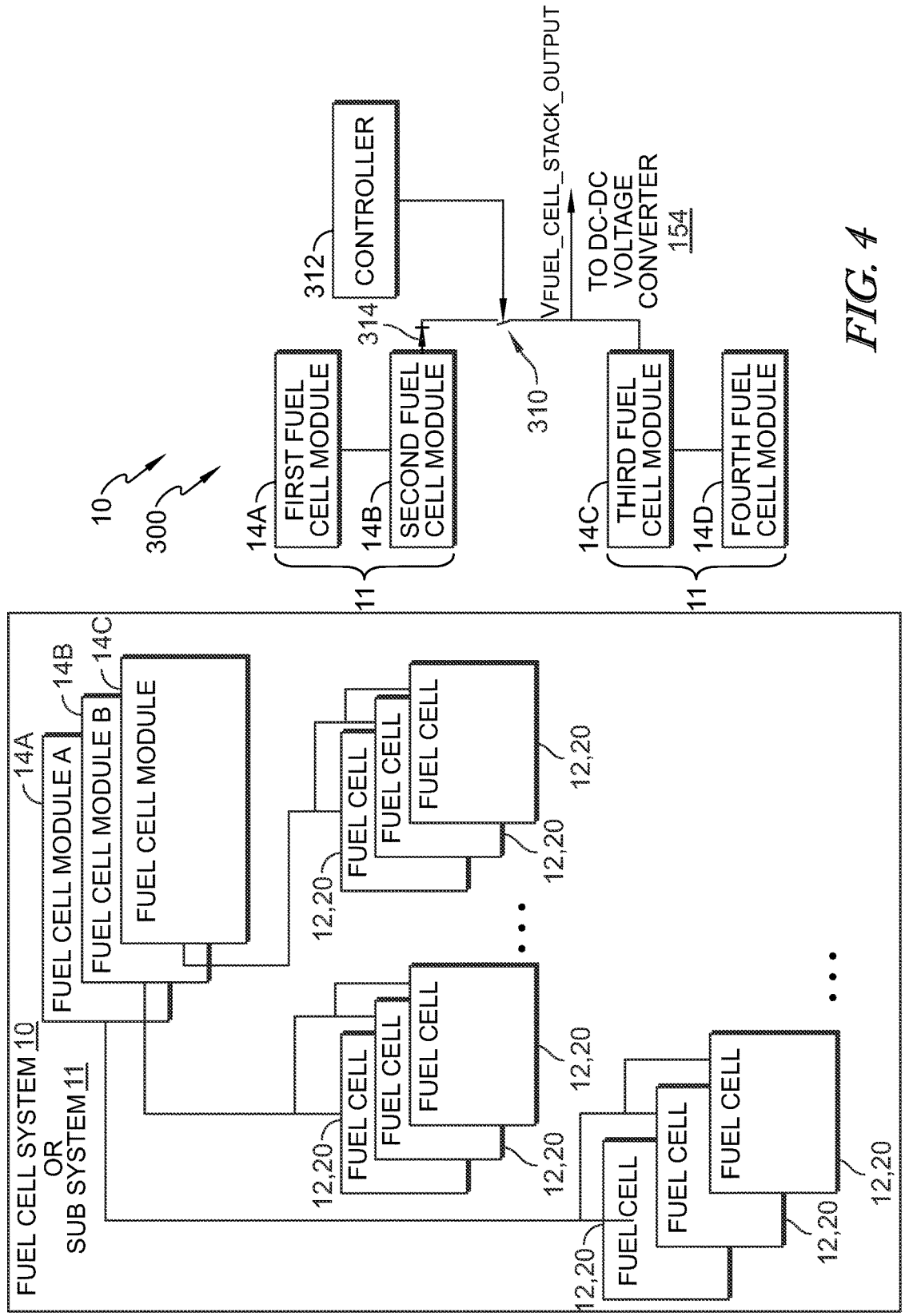

FUEL CELL SYSTEMS WITH SERIES-CONNECTED SUBSYSTEMS

CROSS-REFERENCE TO RELATED APPLICATIONS

This nonprovisional application claims the benefit and priority under 35 U.S.C. § 119(e) and any other applicable laws or statutes, to U.S. Provisional Patent Application Ser. No. 63/240,709 filed on Sep. 3, 2021, the entire disclosure of which is hereby expressly incorporated therein by reference.

TECHNICAL FIELD

The present disclosure generally relates to systems and methods for operating a fuel cell system having at least two fuel cell modules electrically connected in series.

BACKGROUND

Fuel cells are known for their efficient use of fuel to develop direct current (DC). Fuel cells are typically amassed in electrical series in an assembly of fuel cells to produce power at useful voltages or currents. Therefore, interconnected structures are used to connect or couple adjacent fuel cells in series or parallel to form a fuel cell stack or a fuel cell system.

Selective utilization of a fuel cell stack or system comprising multiple fuel cells may include limiting, reducing, and/or regulating the number of fuel cells that are operational. For example, a fuel cell stack or system comprising fuel cells, may operate only a portion of the fuel cell stack or system, such as any subset or number of fuel cells (e.g., only 10 fuel cells, 6 fuel cells, or 4 fuel cells) that provide the necessary power to operate the vehicle and/or powertrain at an acceptable level.

Additionally, selective utilization of a fuel cell stack or system comprising multiple fuel cells may include limiting, reducing, and/or regulating the power capacity provided by any proportion of fuel cells of total fuel cell system that is operational. For example, a fuel cell stack or system comprising any number of fuel cells operating at 100% capacity, may be selectively utilized to operate at any capacity ranging from 0% to about 100%, including any specific operational capacity percentage comprised therein.

A failure of one or more fuel cell modules may cause the entire propulsion system and/or power generation system to become inoperative. Accordingly, sources of continuous, uninterrupted delivery of power may be needed. The present disclosure generally relates to systems and methods for operating a fuel cell system having at least two fuel cell modules electrically connected in series to provide uninterrupted power.

SUMMARY

Embodiments of the present disclosure are included to meet these and other needs. In one aspect of the present disclosure, described herein, a bypass system or apparatus includes a fuel cell stack and/or system, a switching device, and a controller. The fuel cell system includes a first fuel cell module, a second fuel cell module electrically connected in series with the first fuel cell module, and a third fuel cell module electrically connected in parallel with the first fuel cell module and second fuel cell module. The switching device is electrically coupled between the third fuel cell module and the first and second fuel cell modules. The controller is configured to, in response to an output voltage of at least one of the first fuel cell module and the second fuel cell module being less than a threshold, operate to open the switching device to disconnect the first and second fuel cell modules from the third fuel cell module to provide continuous, uninterrupted flow of an output voltage from the third fuel cell module.

In some embodiments, each of the first fuel cell module, the second fuel cell module, and the third fuel cell module may include a plurality of fuel cells electrically connected with one another. In some embodiments, the switching device may be one of a contactor and a semiconductor switching device. In some embodiments, the semiconductor switching device may be one of a field effect transistor and a bipolar junction transistor.

In some embodiments, the bypass system may further include a direct current (DC)-to-DC converter (also referred to as a DC-DC converter) electrically connected to an output of the fuel cell system. The output voltage of the third fuel cell module may correspond to a minimum input voltage of the DC-DC converter. In some embodiments, the bypass system may further include a diode electrically connected at least one of the first fuel cell module and the second fuel cell module to prevent a reverse flow of current toward the first and second fuel cell modules occurring responsive to the switching device being opened.

In some embodiments, prior to the switching device being open, an output voltage of the fuel cell system (e.g., a total output voltage of the fuel cell system) may correspond to a combination of the output voltage of the third fuel cell module and a sum of the output voltages of the first fuel cell module and the second fuel cell module. In some embodiments, an output voltage of the fuel cell system (e.g., a total output voltage of the fuel cell system) may correspond to the output voltage of the third fuel cell module in response to the switching device being open.

In a second aspect of the present disclosure, a method of operating a bypass system includes the steps of, in response to an output voltage of at least one of a first fuel cell module and a second fuel cell module of a fuel cell system being less than a threshold, opening a switching device to electrically disconnect the first and second fuel cell modules from a third fuel cell module of the fuel cell system to provide continuous, uninterrupted flow of output voltage from the third fuel cell module. The first fuel cell module is electrically connected in series to the second fuel cell module, and the third fuel cell module is electrically connected in parallel to the first fuel cell module and the second fuel cell module.

In some embodiments, each of the first fuel cell module, the second fuel cell module and the third fuel cell module may include a plurality of fuel cells electrically connected with one another. In some embodiments, opening the switching device may include opening one of a contactor and a semiconductor switching device. In some embodiments, the semiconductor switching device may be one of a field effect transistor and a bipolar junction transistor. In some embodiments, the method may further include electrically coupling an output of the fuel cell system to a direct current DC-to-DC converter. The output voltage from the third fuel cell module may correspond to a minimum input voltage of the DC-DC converter.

In some embodiments, the method may further include electrically connecting a diode to at least one of the first fuel cell module and the second fuel cell module to prevent a reverse flow of current toward the first and second fuel cell modules occurring responsive to the switching device being opened. In some embodiments, prior to opening the switching device, an output voltage of the fuel cell system (e.g., a total output voltage of the fuel cell system) may correspond to a combination of an output voltage of the third fuel cell module and a sum of output voltages of the first fuel cell module and the second fuel cell module. In some embodiments, in response to the opening of the switching device, an output voltage of the fuel cell system (e.g., a total output voltage of the fuel cell system) may correspond to an output voltage of the third fuel cell module.

In a third aspect of the present disclosure, a fuel cell storage and propulsion system or apparatus for fuel (e.g., a fuel cell fuel storage and propulsion system) includes a traction motor, a fuel cell system electrically connected to provide an output voltage to operate the traction motor, and a voltage converter electrically coupled between an output of the fuel cell system and an input of the traction motor. The fuel cell system includes a first fuel cell module, a second fuel cell module, a third fuel cell module, and a fourth fuel cell module. The first fuel cell module is electrically connected in series to the second fuel cell module, and the third fuel cell module is electrically connected in series to the fourth fuel cell module. The first and second fuel cell modules are connected in parallel to the third and fourth fuel cell modules such that, in response to an output voltage of at least one of the first fuel cell module and the second fuel cell module being less than a threshold, the first and second fuel cell modules are disconnected from the output of the fuel cell system to provide continuous, uninterrupted flow of voltage from the third and fourth fuel cell modules to the voltage converter.

In some embodiments, each of the first fuel cell module, the second fuel cell module, the third fuel cell module, and the fourth fuel cell module may include a plurality of fuel cells electrically connected with one another. In some embodiments, the fuel cell storage and propulsion system for fuel may further include a switching device electrically coupled between the output of the fuel cell system and the first and second fuel cell modules and the third and fourth fuel cell modules. The first and second fuel cell modules may be disconnected from the output of the fuel cell system in response to the switching device being opened. In some embodiments, the fuel cell storage and propulsion system for fuel may further include a diode electrically connected to at least one of the first fuel cell module and second fuel cell module prevent a reverse flow of current toward the first and second fuel cell modules occurring responsive to the switching device being opened.

BRIEF DESCRIPTION OF THE DRAWINGS

The detailed description particularly refers to the following figures, in which:

FIG. 1B is an illustration of the fuel cell system including one or more fuel cell modules;

FIG. 1C is an illustration of components of a fuel cell in the fuel cell stack;

FIG. 3 is a block diagram illustrating an example fuel cell stack of the fuel cell vehicle of FIG. 2;

FIG. 4 is a block diagram illustrating an example bypass system according to the present disclosure.

These and other features, aspects, and advantages of the present invention will become better understood when the following detailed description is read with reference to the accompanying drawings described herein. Reference is also made to the accompanying drawings that form a part of the present disclosure and show, by way of illustration of specific embodiments, in which ways the invention may be practiced. These embodiments are described in sufficient detail to enable those skilled in the art to practice what is claimed and are not limiting. Instead, it is to be understood that other embodiments may be utilized and that logical mechanical and electrical changes may be made without departing from the spirit and scope of the invention and/or claims.

DETAILED DESCRIPTION

Figure 1A:
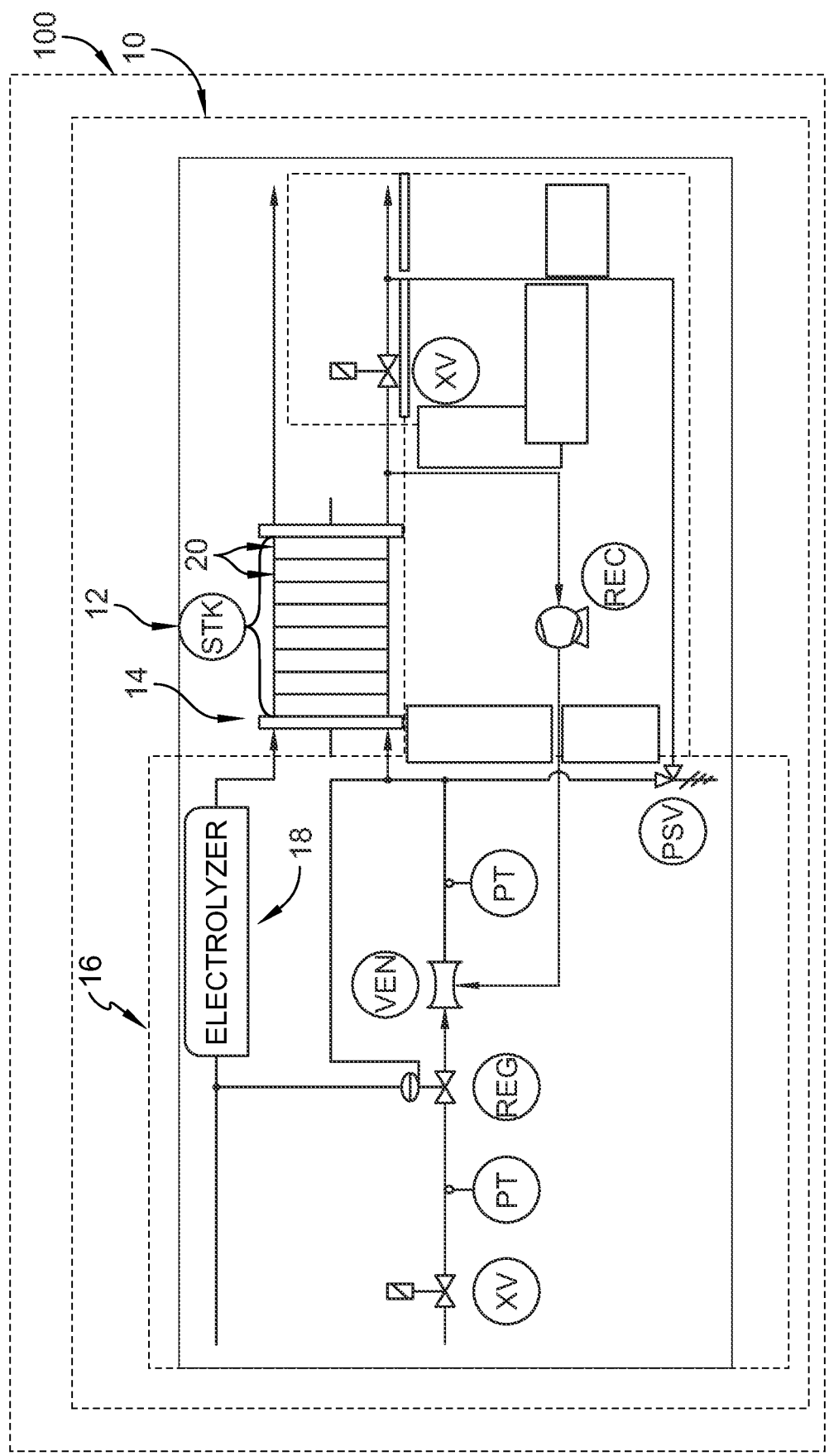
FIG. 1A is an illustration of a fuel cell system including one or more fuel cell stacks connected to a balance of plant.

As shown in FIG. 1A, fuel cell systems 10 often include one or more fuel cell stacks 12 or fuel cell modules 14 connected to a balance of plant (BOP) 16, including various components, to create, generate, and/or distribute electrical power to meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 connected together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cell stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cells (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layer (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26. The above mentioned components, 22, 24, 26, 30 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plate (BPP) 28, 30 can uniformly distribute reactants 32, 34 to an active area 40 of each fuel cell 20 through oxidant flow fields 42 and/or fuel flow fields 44. The active area 40, where the electrochemical reactions occur to generate electrical power produced by the fuel cell 20, is centered within the gas diffusion layer (GDL) 24, 26 and the bipolar plate (BPP) 28, 30 at the membrane electrode assembly (MEA) 22. The bipolar plate (BPP) 28, 30 are compressed together to isolate and/or seal one or more reactants 32 within their respective pathways, channels, and/or flow fields 42, 44 to maintain electrical conductivity, which is required for robust during fuel cell 20 operation.

The fuel cell system 10 described herein, may be used in stationary and/or immovable power system, such as industrial applications and power generation plants. The fuel cell system 10 may also be implemented in conjunction with electrolyzers 18 and/or other electrolysis system 18. In one embodiment, the fuel cell system 10 is connected and/or attached in series or parallel to an electrolysis system 18, such as one or more electrolyzers 18 in the BOP 16 (see FIG. 1A). In another embodiment, the fuel cell system 10 is not connected and/or attached in series or parallel to an electrolysis system 18, such as one or more electrolyzers 18 in the BOP 16.

The present fuel cell system 10 may also be used in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy duty vehicle.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

A fuel cell system 10 of the present disclosure includes combining into a subsystem 11 two or more fuel cell modules 14 being connected in series with one another. In particular, bypassing two or more series-connected fuel cell modules 14, where one or more of the series-connected fuel cell modules 14 have a fault or are, otherwise, inoperative and/or inoperable to enable the rest of the fuel cell system 10 to remain in operation. In some instances, a series-connected subsystem 11 of fuel cell modules 14 may be connected electrically in parallel with other such subsystems 11 either before or after a DC-DC converter 154. In other instance, a series-connected subsystem 11 of the fuel cell modules 14 may be electrically connected without any such DC-DC converter 154 allowing the continued operation of each subsystem 11 by bypassing the faulted module(s) 14.

A bypass system 300 of the present disclosure includes one or more electrical devices and/or electrical semiconductor devices, such as diodes 314, electrical contactors 310, or a MOSFET 310. In some instances, selection of a the one or more electrical devices and/or electrical semiconductor devices may be based on an amount of current flow of the fuel cell power module and/or a reverse voltage of the sum of open circuit fuel cell voltages. Amounts of current generated by the fuel cell 20 is dependent on the active area of the fuel cell membrane 22 and the current density the fuel cell 20 is operated at. In this particular embodiment, currents upwards of 1000 Amps could be supported and a reverse voltage may range from 0 V to the number of series-connected elements in the complete string multiplied by 1.23 V.

The subsystem 11 within which a fault has occurred may continue operation with the current bypassing the fuel cell 20 and with the air supply 34 and hydrogen supply 32 of the faulted fuel cell module 14 disabled. The bypass system 300 of the present disclosure may include one or more hardware devices configured to disable a flow of hydrogen 32 to a given fuel cell module 14 in response to voltage of the fuel cell module 14 being less than a threshold.

In some instances, the output voltage of the fuel cell stack subsystem 11, where one or more fuel cell modules 14 have been disabled and/or bypassed, may be based on a minimum input voltage of a DC-DC converter 154 of an energy conversion and delivery system.

The bypass system 300 of the present disclosure enables a continuous, uninterrupted generation and delivery of power allowing power to continue to be supplied by the subsystem 11 without any interruption in power delivery (other than a reduction in output power) if providing more power than possible for the remaining fuel cell modules 14 in a subsystem 11. A faulting scheme for applications where a brief interruption can be tolerated can be implemented that allows for multiple faults of the same module 14 prior to its identification of a hard fault and locking out.

Figure 2:
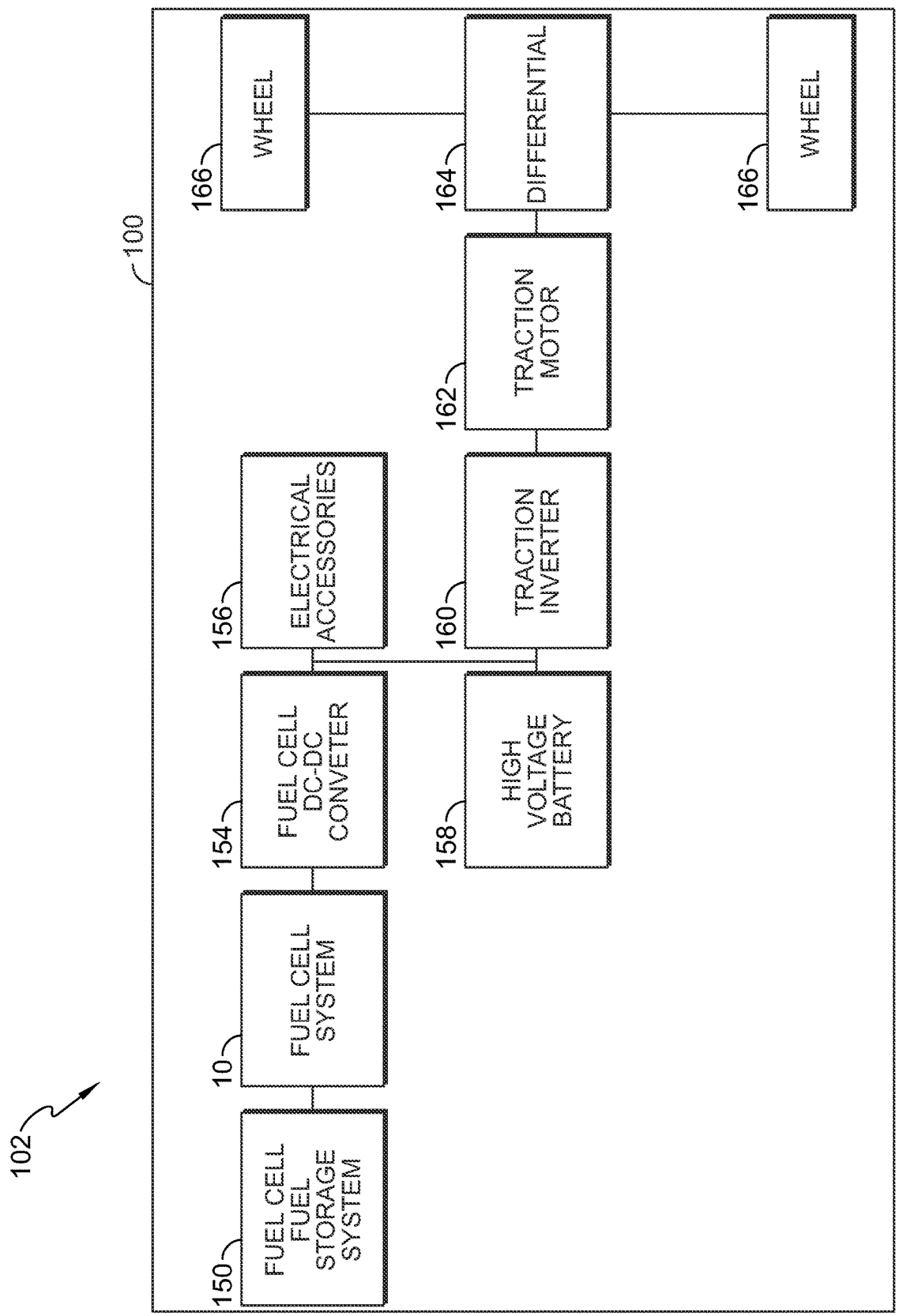
FIG. 2 is a block diagram illustrating an example fuel cell vehicle.

FIG. 2 illustrates an example fuel cell storage and propulsion system 102 for fuel on an exemplary fuel cell vehicle 100. While a vehicle 100 is illustrated, fuel cell systems 10 of the present disclosure may be used on mobile or stationary applications. Stationary fuel cell 20 applications of the present disclosure comprise fuel cell systems 10 that encounter limited, minimal movement, or no movement (e.g., fuel cells 20 do not move at all), such as industrial fuel cell systems 10. Stationary fuel cell 20 applications of the present disclosure may also comprise mobile or movable fuel cell systems 10 that are capable to become stationary, such as by temporarily or permanently stopping or halting their movement. An exemplary stationary fuel cell 20 application of the present disclosure are mobile fuel cell systems 10 that become stationary, such as fuel cell systems 10 aboard a vehicle 100.

The example fuel cell storage and propulsion system or apparatus 102 for fuel 32 includes a fuel cell fuel storage system 150, a fuel cell system 10, a high voltage battery 158, and a traction motor 162. The fuel cell fuel storage system 150 of the exemplary fuel cell vehicle 100 provides fuel 32 to the fuel cell system 10. The fuel cell system 10 uses a chemical process to generate electrical energy from the fuel cell fuel 32. Illustrative fuels 32 of a fuel cell 20 are hydrogen, hydrogen-based, natural gas, compressed gas, hazardous liquids, methanol, ethanol, or combinations thereof. In an exemplary embodiment, the fuel 32 is hydrogen or hydrogen-based. Fuel 32 interacts with an oxidant 34 (e.g., oxygen or air) in a fuel cell system 10 in order to electrochemically produce electricity that will power one or more applications.

Fuel 32, such as hydrogen or a hydrocarbon, is channeled through field flow plates 28, 30 to an anode on one side of the fuel cell 20 or fuel cell stack 12, while oxygen 34 from the air is channeled to a cathode on the other side of the fuel cell 20 or fuel cell stack 12. At the anode, a catalyst, such as a platinum catalyst, causes the hydrogen 32 to split into positive hydrogen ions (protons) and negatively charged electrons. In the case of a PEMFC, the polymer electrolyte membrane (PEM) permits the positively charged ions to flow through the PEM to the cathode. The negatively charged electrons are directed along an external loop to the cathode, creating an electrical circuit and/or an electrical current). At the cathode, the electrons and positively charged hydrogen ions combine with oxygen to form water, which flows out of the fuel cell 20 or fuel cell stack 12. Fuel stream is exhausted from a fuel cell 20 or fuel cell stack 12 outlet and recirculated back to the anode through an anode inlet.

In an illustrative embodiment, a primary power source of the vehicle 100 may be the fuel cell system 10. FIG. 3 illustrates an example implementation of the fuel cell system 10 of the vehicle 100 of FIG. 2. The fuel cell system 10 may comprise one or more, multiple, and/or a plurality of fuel cells 20 and/or fuel cell stacks 12. A typical fuel cell 20 is a multi-component assembly. Multiple fuel cells 20 may be compressed and bound into a single fuel cell system 10.

The plurality of fuel cells 20 may be configured to be connected and/or stacked in series in order for the fuel cell system 10 to generate the required power to operate the vehicle 100. In an example, one or more of the plurality of fuel cells 20 may be electrically connected, or otherwise combined, with one another into subsets, or modules 14, prior to being combined into the single fuel cell system 10. As just one example, a given fuel cell system 10 including 600 fuel cells 20 may include 3 fuel cell modules 14 of 200 fuel cells 20 per fuel cell module 14. Of course, other combinations of numbers of fuel cells 20 per fuel cell system 10, numbers of fuel cells 20 per fuel cell module 14, and/or numbers of fuel cell modules 14 per fuel cell system 10 are also contemplated.

A fuel cell 20 may produce power as a voltage output. In some instances, an output voltage of the fuel cell system 10 may be determined based on a product between voltage output of a single fuel cell 20 and a number of fuel cells 20 stacked together, such as in a fuel cell stack 12. Fuel cells 20, fuel cell modules 14, or fuel cell systems 10 often use hydrogen 32 or hydrogen-rich fuel 32 to generate electricity that may power an application, such as an electric motor.

The fuel cell 20, the fuel cell modules 14, or fuel cell system 10 may generate electricity from electrochemical reactions between hydrogen (fuel) 32 and oxygen (oxidant) 34 in the fuel cell 20, the fuel cell module 14, or fuel cell system 10.

As illustrated in FIG. 2, the electrical energy generated by the fuel cell system 10 may be stored in the high voltage battery 158 for use by one or more propulsion or non-propulsion components of the example fuel cell vehicle 100. Further, at least a portion of the electrical energy generated by the fuel cell system 10, whether directly or via the high voltage battery 158, may be used to power the traction motor 162. The traction motor 162 is mechanically coupled to a differential 164 that distributes power to wheels 166 to operate the example fuel cell vehicle 100. Still further, at least a portion of the electrical energy generated by the fuel cell system 10, whether directly or via the high voltage battery 158, may be transferred to power electrical components and/or accessories 156 of the example fuel cell vehicle 100, such as interior lighting, cabin cooling, and infotainment system (not shown).

A fuel cell DC-DC converter 154 steps up DC power output by the fuel cell system 10 to a voltage compatible with the electrical accessories 156 and/or the high voltage battery 158. A traction inverter 160 inverts DC power supplied by the high voltage battery 158 and/or by the fuel cell system 10 to AC power compatible with the traction motor 162. The traction inverter 160 may be bi-directional and may convert AC power output by the traction motor 162 operating in a generator mode to DC power for transfer to the high voltage battery 158. In some instances, the output voltage of the fuel cell stack subsystem 11, where one or more fuel cell modules 14 have been disabled and/or bypassed, may be based on a minimum input voltage of a DC-DC converter 158 of the energy conversion and delivery system.

FIG. 4 illustrates an example bypass system 300 according to the present disclosure. The example bypass system 300 includes a first fuel cell module 14A, a second fuel cell module 14B, a third fuel cell module 14C, and a switching device 310. The second fuel cell module 14B is electrically connected in series with the first fuel cell module 14A. The third fuel cell module 14C is electrically connected in parallel with the first fuel cell module 14A and the second fuel cell module 14B. The switching device 310 is electrically coupled between the third fuel cell module 14C and the first and second fuel cell modules 14A, 14B.

A controller 312 is configured to control the switching device 310 to open and close in response to one or more operating conditions of the fuel cell system 10 or another component, assembly, or subsystem of the vehicle 100 being met. For example, the controller 312, in response to an output voltage of at least one of the first fuel cell module 14A and the second fuel cell module 14B being less than a threshold, operates to open the switching device 310 to disconnect the first and second fuel cell modules 14A, 14B from the third fuel cell module 14C to provide continuous, uninterrupted flow of output voltage from the third fuel cell module 14C. In an example, output voltage of the third fuel cell module 14C corresponds to a minimum input voltage of the DC-DC converter 154.

Accordingly, the bypass system 300 of the present disclosure enables a continuous, uninterrupted generation and delivery of power allowing power to continue to be supplied by the fuel cell system 10 without any interruption in power delivery (other than a reduction in output power) if providing more power than possible for the remaining fuel cell modules 14, e.g., the third fuel cell module 14C, in a subsystem 11. A faulting scheme for applications where a brief interruption can be tolerated can be implemented that allows for multiple faults of the same module 14 prior to its identification of a hard fault and locking out.

Prior to the switching device 310 being open, an output voltage of the fuel cell system 10 (e.g., a total output voltage of the fuel cell system) corresponds to a combination of output voltage of the third fuel cell module 14C and a sum of output voltages of the first fuel cell module 14A and the second fuel cell module 14B. In response to the switching device 310 being open, the output voltage of the fuel cell system 10 corresponds to the output voltage of the third fuel cell module 14C.

In one example, the bypass system 300 includes a fourth fuel cell module 14D. The third fuel cell module 14C is electrically connected in series to the fourth fuel cell module 14D. Accordingly, in response to the switching device 310 being open, an output voltage of the fuel cell system 10 corresponds to a sum of output voltages of the third fuel cell module 14C and the fourth fuel cell module 14D.

The switching device 310 may be an electrical or an electromechanical device configured to, when closed, establish a continuous electrical connection between a first end of the switching device 310 and a second end of the switching device 310 and/or between one or more devices connected about the first and second ends of the switching device 310. The switching device 310 is configured to, when open, interrupt the flow of energy between the first end of the switching device 310 and the second end of the switching device 310 and/or between one or more devices connected about the first and second ends of the switching device 310. In an example, the switching device 310 is one of a contactor and a semiconductor switching device. Examples of semiconductor switching devices include, but are not limited to, a field-effect transistor (FET), a bipolar junction transistor (BJT), a metal-oxide semiconductor field-effect transistor (MOSFET), and insulated-gate bipolar transistor (IGBT).

In an example, the bypass system 300 includes a diode 314 electrically connected to prevent a reverse flow of current toward the first and second fuel cell modules 14A, 14B that may occur responsive to the switching device 310 being opened.

Figure 5:
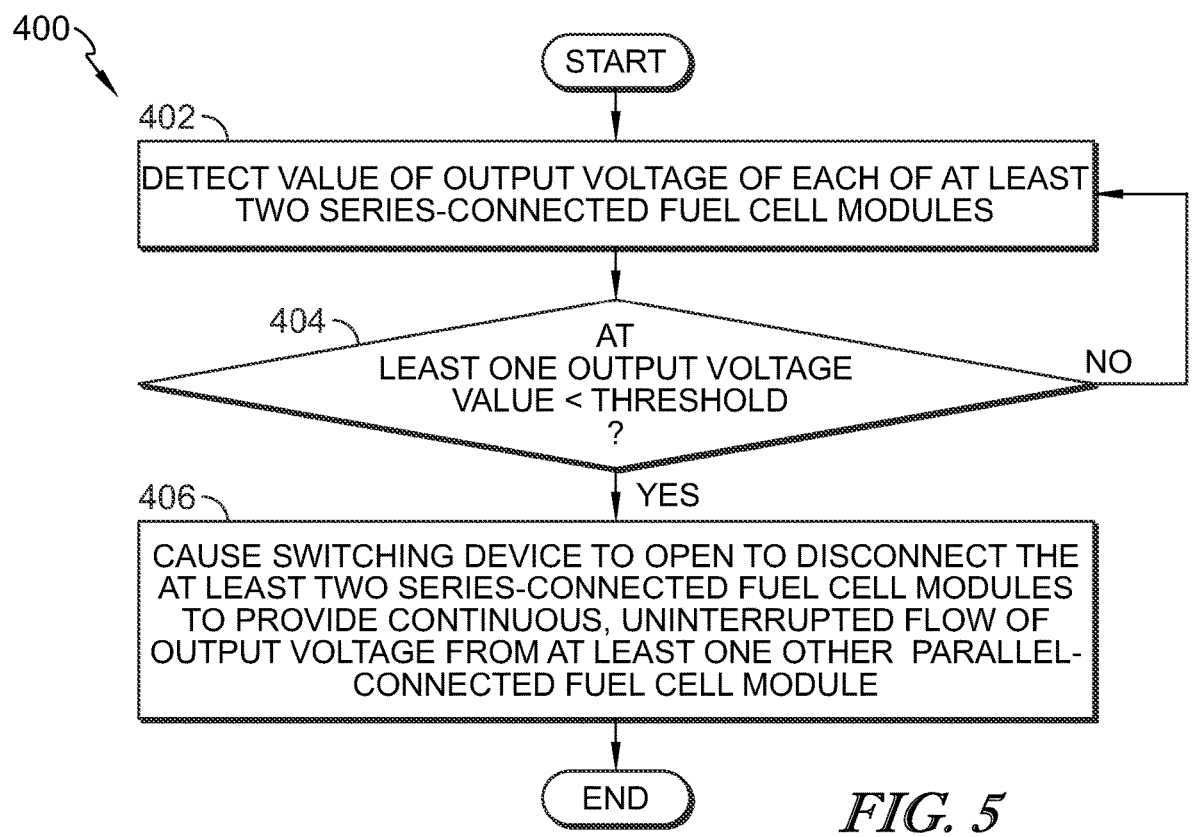
FIG. 5 is a block diagram illustrating an exemplary process flow for providing continuous, uninterrupted flow of power from the fuel cell stack.

FIG. 5 illustrates an example process and/or method 400 for providing continuous, uninterrupted flow of energy from the fuel cell system 10 of the vehicle 100. One or more operations of the example process 400 may be performed by the controller 312 according to the present disclosure. The example process 400 may begin at block 402 where the controller 312 detects, or receives a signal indicative of, a value of output voltage of each of at least two series-connected fuel cell modules 14, e.g., the first fuel cell module 14A and the second fuel cell module 14B. At block 404, the controller 312 determines whether the value of output voltage is less than a threshold. In response to the value of output voltage being greater than a threshold, the controller 312 may return to block 402 where it detects value of output voltage of the at least two series-connected fuel cell modules 14 (e.g., first fuel cell module 14A and second fuel cell module 14B).

In response to an output voltage of at least one of the first fuel cell module 14A and the second fuel cell module 14B of a fuel cell system 10 being less than a threshold, the controller 312, at block 406, operates to open the switching device 310 to electrically disconnect the first and second fuel cell modules 14A, 14B from the third fuel cell module 14C of the fuel cell system 10 to provide continuous, uninterrupted flow of output voltage from the third fuel cell module 14C, where the third fuel cell module 14C is electrically connected in parallel to the first fuel cell module 14A and the second fuel cell module 14B. The process 400 may then end. In some instances, the example process 400 may be repeated in response to the controller 312 detecting the value of output voltage of each of at least two series-connected fuel cell modules 14 (e.g., first fuel cell module 14A and second fuel cell module 14B).

Figure 6:
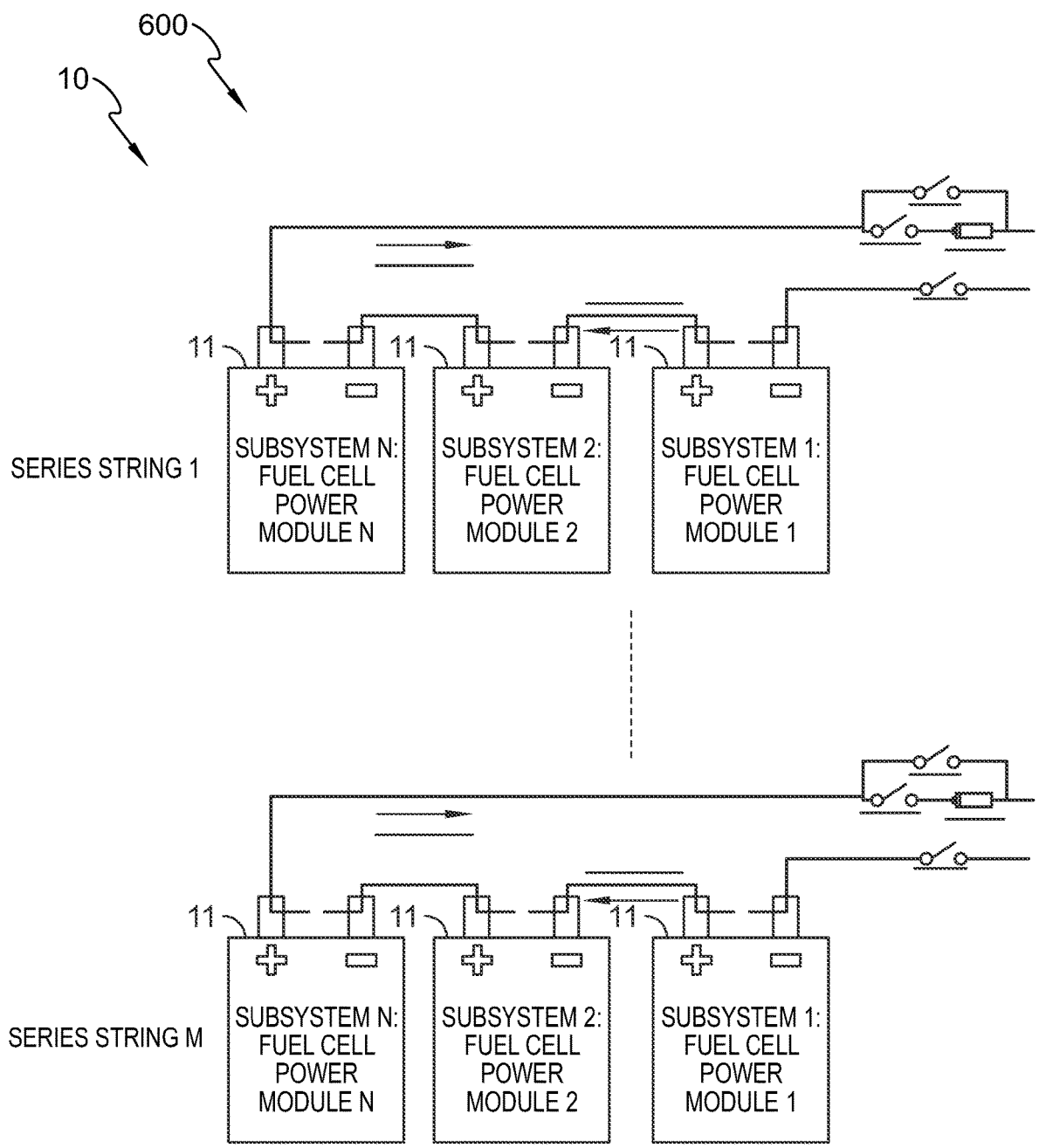
FIG. 6 is a block diagram illustrating another example fuel cell stack of the fuel cell vehicle of FIG. 2.

The fuel cell control system 600 of the present disclosure relates to a control methodology and integration hardware for operating fuel cell systems 10, and more specifically, for operating fuel cell systems 10 in fail-safe applications that are composed of a plurality of fuel cell sub-systems 11 such that the failure of any one sub-system 11 does not impact the ability of the fuel cell system 10 as a whole to meet the necessary operational criteria. (e.g., see FIG. 7) The fuel cell system 10 as a whole can consist of N fuel cell subsystems 11 in series and then a paralleling of M of these "series strings" either by way of contactors 310 or by way of a connection through a DC-DC converter 154; such that there are P=N×M total fuel cell subsystems 11 constituting the entire fuel cell system 10. (e.g., see FIG. 6)

This N−1 redundancy or even M−1 redundancy (e.g., see FIG. 6) may be useful when integrating fuel cells 20 into applications such as aerospace applications, where a single failure cannot take down the system operation, and for railway applications where penalties for blocking a section of railroad track require a mandatory system reliability such that no one failure can result in system inoperability.

In particular, where the fuel cell system 10 is connected to a load (not shown) either directly, e.g., through contactors 310, or via a DC-DC converter 154, the system 102 design is such that, despite one or more failures having occurred within the system 102, the fuel cell system 10 is still able to meet the voltage requirements of the load and/or DC/DC in this N−1 or M−1 operating mode. As another example, where the end application requirements permit, the details of this invention are not limited to N−1 or M−1 but could be extended scenarios of multiple modules 14 becoming inoperative.

The system 600 in accordance with the present disclosure includes the following features. A finite state machine and fault escalation procedure embedded within an overall fuel cell system controller 312 that manages the power being supplied by each of the independent subsystems 11 through a maximum power allowed or maximum current allowed control scheme and is able to shift the maximum power allowed between subsystems 11.

A finite state machine and fault escalation procedure embedded within each subsystem controller 312 that details the fault and alarming process of each subsystem 11 and that depending on the severity of the localized fault may be configured to "lock out" or otherwise exclude, the module 14 from the remainder of the system 10 until a master reset command is given. In this instance the load being supplied by the "series string" as a whole would not be interrupted but the load would be instantaneously shifted to the other modules 154 in the same series string. The overall fuel cell control system 600 would then in a short manner of time be able to shift load to another operating string if desired. The subsystem controller 312 may be configured to attempt to restart the unit of the series connection that has become wholly or partly inoperative, e.g., the controller 312 may automatically reset the fault result. In this instance load being supplied by the other modules 14 in the series string would also be interrupted to allow a string pre-charge process to occur.

Figure 7:
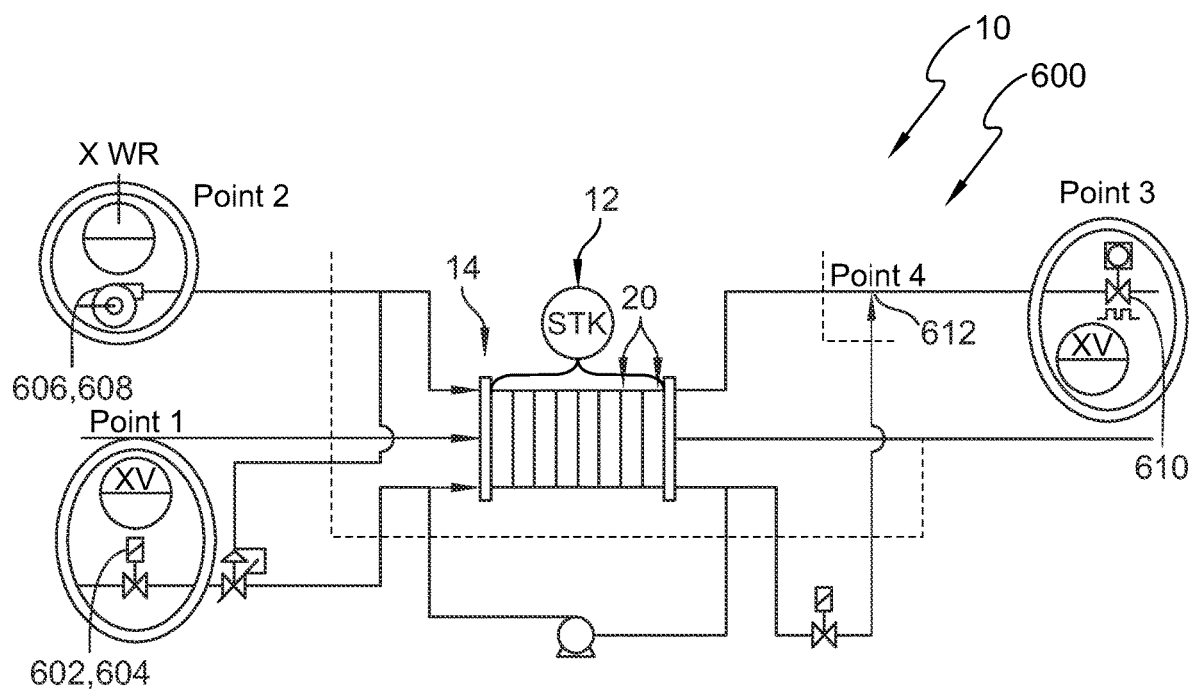
FIG. 7 is a block diagram illustrating one example implementation of hardware components arrangements for controlling power distribution to and from the fuel cell stack of the fuel cell vehicle of FIG. 1.
Figure 8:
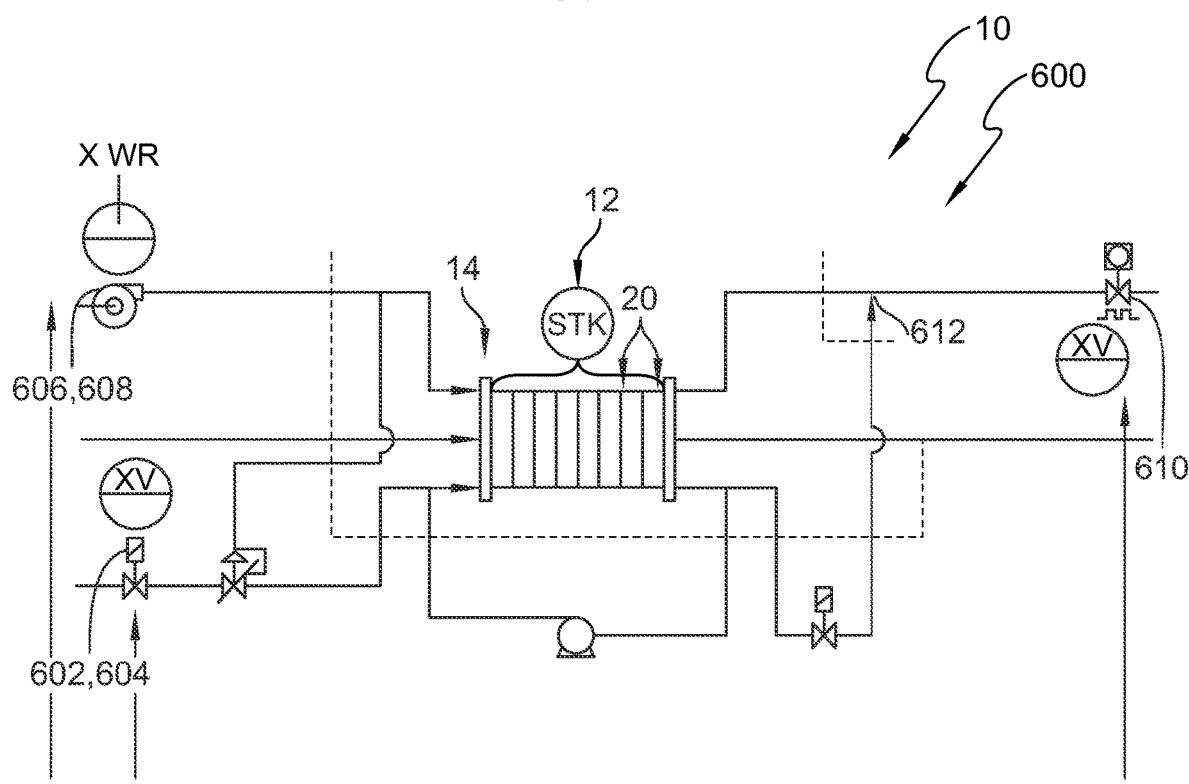
FIG. 8 is a block diagram illustrating another example implementation of hardware components arrangements for controlling power distribution to and from the fuel cell stack of the fuel cell vehicle of FIG. 1.

FIGS. 7 and 8 illustrate example implementations of one or more aspects of a control system 600 of the present disclosure. In one implementation, as shown in FIGS. 7 and 8, the system 600 of present disclosure includes embedding hardware architecture at the subsystem 11 level in order to allow the immediate shunting of current around a faulted module 14 and the safe operation of the other modules 14 in the same series string and other parallel strings without causing further damage or degradation to the subsystem 11 being bypassed. In general, implemented hardware components include, but are not limited to, instantaneous current shunting hardware and the integrated appropriate cooling for the shunting hardware. (E.g., see FIGS. 7 and 8.)

As another example, components of the system 600 of the present disclosure may include a shutoff hydrogen solenoid valve to prevent hydrogen 32 from entering the module being bypassed. As still another example, the system 600 of the present disclosure includes independent air control that can be accomplished with an air shutoff valve implemented at the subsystem 11 level and also with independent control of the air supply component; being either a compressor or blower. (E.g., see FIGS. 7 and 8.) As yet another example, the system 600 of the present disclosure includes integrated contactors 310 and pre-charge circuitry at the series string level as well as the interlocking of the control of these devices so that the any module 14 in a series string as well as the overall system controller 312 can determine whether or not to disconnect the load being supplied by any one given subsystem 11 or not. (E.g., see FIGS. 7 and 8.)

With reference to FIG. 7, Point 1 indicates the mass air flow sensor 602 or flow transmitter 604 utilized by the fuel cell system 10. This component 602, 604 must have its voltage versus mass air flow characteristic mapped in order to ensure proper operation of the comparator dilution circuit.

Point 2 of FIG. 7 indicates the air blower 606 or compressor 608 utilized in order to operate the air flow. The blower 606 or compressor 608 may be the same blower 606 or compressor 608 that is used to provide the dilution air flow. The blower 606 or compressor 608 does not require hazardous area certification as would a dilution fan or blower as it operates on the fuel cell inlet and ensures that the exhaust of the fuel cell system 10 is non-hazardous without operating within it. Furthermore, because this blower 606 or compressor 608 provides the required dilution flow it ensures that any component integrated in the combined exhaust system also does not need hazardous area certification.

Point 3, as illustrated in at least FIG. 7, indicates the purge valve 610 utilized by the fuel cell system 10. This component must have its driven open condition hydrogen flow characterized for the system it is being implemented into. This pro-vides the flow of hydrogen that must be diluted against.

FIG. 7 illustrates Point 4 indicating the point of mixing 612 between the air exhaust and purge valve exhaust to form the combined exhaust system. In an example implementation, the mixing point 612 may be integrated directly into the fuel cell manifold system or endplate via an integrated purge channel.

It should be noted that a fault management and escalation process must be a part of the decision when determining for how long a module(s) 14 or string(s) should be disconnected or bypassed as part of the present disclosure. The fault management and escalation system 600 operates the system 10 based upon a predefined minimum power or current of operation and/or based on a predefined minimum air flow of operation. Taken together, a predefined minimum power or current of operation and a predefined minimum air flow of operation, and/or the control system 600 of the present disclosure will help ensure that air flow supplied to the fuel cell system 10 corresponds to a predefined minimum air flow of operation of the fuel cell system 10 and/or corresponds to the minimum power or current flowing throw the fuel cell system 10. In those instances, when the fuel cell system 10 is not producing power, it may interrupt the flow of air across the fuel cells 20 to minimize or prevent the possibility of the fuel cells 20 drying out.

The system 600 of the present disclosure may be configured to escalate in severity one or more alarms and/or fault events. For example, if a low level alarm or fault event recurs repeatedly, the system 600 of the present disclosure may increase to a severity level of that fault to a higher level alarm or fault, which leads to increased restrictions or more module(s) 14 or string(s) lockouts. A single timer may be implemented that starts at the time of the first low level alarm or fault to enable the fault watch window. If several, e.g., 3 or more, instances of the same fault occur within the fault window, the controller 312 may escalate to a higher level fault. In instances of a fault repeating or reoccurring within any given one or more fuel cell modules 14, the controller 312 of the present disclosure may be configured to "lock out" that one or more fuel cell modules 14 from the rest of the fuel cell system 10 and/or cause the one or more fuel cell modules 14 experiencing a fault to operate in "a diode mode."

The following described aspects of the present invention are contemplated and non-limiting:

A first aspect of the present invention relates to a bypass system or apparatus. The bypass system includes a fuel cell stack and/or system, a switching device, and a controller. The fuel cell system includes a first fuel cell module, a second fuel cell module electrically connected in series with the first fuel cell module, and a third fuel cell module electrically connected in parallel with the first fuel cell module and second fuel cell module. The switching device is electrically coupled between the third fuel cell module and the first and second fuel cell modules. The controller is configured to, in response to an output voltage of at least one of the first fuel cell module and the second fuel cell module being less than a threshold, operate to open the switching device to disconnect the first and second fuel cell modules from the third fuel cell module to provide continuous, uninterrupted flow of an output voltage from the third fuel cell module.

A second aspect of the present invention relates to a method of operating a bypass system. The method includes the steps of, in response to an output voltage of at least one of a first fuel cell module and a second fuel cell module of a fuel cell system being less than a threshold, opening a switching device to electrically disconnect the first and second fuel cell modules from a third fuel cell module of the fuel cell system to provide continuous, uninterrupted flow of output voltage from the third fuel cell module. The first fuel cell module is electrically connected in series to the second fuel cell module, and the third fuel cell module is electrically connected in parallel to the first fuel cell module and the second fuel cell module.

A third aspect of the present invention relates to a fuel cell storage and propulsion system or apparatus for fuel (e.g., a fuel cell fuel storage and propulsion system). The fuel cell storage and propulsion system or apparatus for fuel includes a traction motor, a fuel cell system electrically connected to provide output voltage to operate the traction motor, and a voltage converter electrically coupled between an output of the fuel cell system and an input of the traction motor. The fuel cell system includes a first fuel cell module, a second fuel cell module, a third fuel cell module, and a fourth fuel cell module. The first fuel cell module is electrically connected in series to the second fuel cell module, and the third fuel cell module is electrically connected in series to the fourth fuel cell module. The first and second fuel cell modules are connected in parallel to the third and fourth fuel cell modules such that, in response to an output voltage of at least one of the first fuel cell module and the second fuel cell module being less than a threshold, the first and second fuel cell modules are disconnected from the output of the fuel cell system to provide continuous, uninterrupted flow of voltage from the third and fourth fuel cell modules to the voltage converter.

In the first aspect of the present invention, each of the first fuel cell module, the second fuel cell module, and the third fuel cell module may include a plurality of fuel cells electrically connected with one another. In the first aspect of the present invention, the switching device may be one of a contactor and a semiconductor switching device. In the first aspect of the present invention, the semiconductor switching device may be one of a field effect transistor and a bipolar junction transistor.

In the first aspect of the present invention, the bypass system may further include a direct current (DC)-to-DC converter (also referred to as a DC-DC converter) electrically connected to an output of the fuel cell system. The output voltage of the third fuel cell module may correspond to a minimum input voltage of the DC-DC converter. In the first aspect of the present invention, the bypass system may further include a diode electrically connected to at least one of the first fuel cell module and the second fuel cell module to prevent a reverse flow of current toward the first and second fuel cell modules occurring responsive to the switching device being opened.

In the first aspect of the present invention, prior to the switching device being open, an output voltage of the fuel cell system (e.g., a total output of the fuel cell system) may correspond to a combination of the output voltage of the third fuel cell module and a sum of the output voltages of the first fuel cell module and the second fuel cell module. In the first aspect of the present invention, an output voltage of the fuel cell system (e.g., a total output of the fuel cell system) may correspond to the output voltage of the third fuel cell module in response to the switching device being open.

In the second aspect of the present invention, each of the first fuel cell module, the second fuel cell module and the third fuel cell module may include a plurality of fuel cells electrically connected with one another. In the second aspect of the present invention, opening the switching device may include opening one of a contactor and a semiconductor switching device. In the second aspect of the present invention, the semiconductor switching device may be one of a field effect transistor and a bipolar junction transistor. In the second aspect of the present invention, the method may further include electrically coupling an output of the fuel cell system to a direct current DC-to-DC converter. The output voltage from the third fuel cell module may correspond to a minimum input voltage of the DC-DC converter.

In the second aspect of the present invention, the method may further include electrically connecting a diode to at least one of the first fuel cell module and the second fuel cell module to prevent a reverse flow of current toward the first and second fuel cell modules occurring responsive to the switching device being opened. In the second aspect of the present invention, prior to the switching device being open, an output voltage of the fuel cell system (e.g., a total output voltage of the fuel cell system) may correspond to a combination of an output voltage of the third fuel cell module and a sum of output voltages of the first fuel cell module and the second fuel cell module. In the second aspect of the present invention, in response to the opening of the switching device, an output voltage of the fuel cell system (e.g., a total output voltage of the fuel cell system) may correspond to an output voltage of the third fuel cell module.

In the third aspect of the present invention, each of the first fuel cell module, the second fuel cell module, the third fuel cell module, and the fourth fuel cell module may include a plurality of fuel cells electrically connected with one another. In the third aspect of the present invention, the fuel cell storage and propulsion system for fuel may further include a switching device electrically coupled between the output of the fuel cell system and the first and second fuel cell modules and the third and fourth fuel cell module. The first and second fuel cell modules may be disconnected from the output of the fuel cell system in response to the switching device being opened. In the third aspect of the present invention, the fuel cell storage and propulsion system for fuel may further include a diode electrically connected to at least one of the first fuel cell module and the second fuel cell module to prevent a reverse flow of current toward the first and second fuel cell modules occurring responsive to the switching device being opened.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

While the concepts of the present disclosure are susceptible to various modifications and alternative forms, specific exemplary embodiments have been shown by way of example in the drawings and have been described. It should be understood, however, that there is no intent to limit the concepts of the present disclosure to the particular forms disclosed; on the contrary, the intention is to cover all modifications, equivalents, and alternatives falling within the spirit and scope of the invention as defined by the appended claims.

References in the specification to "one embodiment," "an embodiment," "an illustrative embodiment," etc., indicate that the described embodiment may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C).

Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

What is claimed is:

1. A fuel cell bypass system comprising:
    a fuel cell system including
        a first fuel cell module,
        a second fuel cell module electrically connected in series with the first fuel cell module, and
        a third fuel cell module electrically connected in parallel with the first fuel cell module and the second fuel cell module,
    a switching device electrically coupled between the third fuel cell module and the first and second fuel cell modules;
    a controller configured to, in response to an output voltage of at least one of the first fuel cell module and the second fuel cell module being less than a threshold, operate to open the switching device in order to disconnect the first and second fuel cell modules from the third fuel cell module and provide continuous, uninterrupted flow of an output voltage from the third fuel cell module, and
    a diode electrically connected to the second fuel cell module and the switching device to prevent a reverse flow of current from the switching device toward the first and second fuel cell modules in response to the switching device being opened.

2. The bypass system of claim 1, wherein each of the first fuel cell module, the second fuel cell module, and the third fuel cell module includes a plurality of fuel cells electrically connected with one another.

3. The bypass system of claim 1, wherein the switching device is one of a contactor and a semiconductor switching device.

4. The bypass system of claim 3, wherein the semiconductor switching device is one of a field effect transistor and a bipolar junction transistor.

5. The bypass system of claim 1, further comprising a direct current DC-DC converter electrically connected to an output of the fuel cell system, wherein the output voltage of the third fuel cell module corresponds to a minimum input voltage of the DC-DC converter.

6. The bypass system of claim 1, wherein, prior to the switching device being open, a total output voltage of the fuel cell system corresponds to a combination of the output voltage of the third fuel cell module and a sum of the output voltages of the first fuel cell module and the second fuel cell module.

7. The bypass system of claim 1, wherein, in response to the switching device being open, a total output voltage of the fuel cell system corresponds to the output voltage of the third fuel cell module.

8. The bypass system of claim 1, further comprising a fourth fuel cell module being electrically connected in series to the third fuel cell module.

9. The bypass system of claim 8, wherein the fourth fuel cell module is electrically connected in parallel to the first and second fuel cell modules or includes a plurality of fuel cells electrically connected with one another.

10. The bypass system of claim 8, wherein, prior to the switching device being open, a total output voltage of the fuel cell system corresponds to a combination of a sum of the output voltages of the third fuel cell module and the fourth fuel cell module and a sum of the output voltages of the first fuel cell module and the second fuel cell module, and in response to the switching device being open, the total output voltage of the fuel cell system corresponds to a sum of the output voltage of the third fuel cell module and the fourth fuel cell module.

11. The bypass system of claim 1, wherein the switching device is configured to, when open, interrupt a flow of energy between a first end of the switching device and a second end of the switching device.

12. The bypass system of claim 1, wherein the bypass system is comprised within a vehicle further including a traction motor, a voltage converter electrically coupled between an output of the fuel cell system comprised within the bypass system and an input of the traction motor, wherein the fuel cell system is electrically connected to provide an output voltage to operate the traction motor.

13. The bypass system of claim 12, wherein the vehicle further comprises a high voltage battery adapted to store electrical energy generated by the fuel cell system.

14. The bypass system of claim 13, wherein the electrical energy generated by the fuel cell system that is stored in the high voltage battery is used to power the traction motor.

15. The bypass system of claim 13, wherein the vehicle further comprises a direct current DC-DC converter electrically coupled to an output of the fuel cell system and a traction inverter electrically coupled to an output of the DC-DC converter and an input of the traction motor, wherein the traction inverter is adapted to invert DC power supplied by at least one of the fuel cell system and the high voltage battery to AC power compatible with the traction motor.

* * * * *